US010174617B2

(12) United States Patent
Whims et al.

(10) Patent No.: US 10,174,617 B2
(45) Date of Patent: Jan. 8, 2019

(54) SYSTEMS AND METHODS FOR DEEP TIP CRACK REPAIR

(71) Applicant: GENERAL ELECTRIC COMPANY, Schenectady, NY (US)

(72) Inventors: Lawrence James Whims, Easley, SC (US); James Ryan Connor, Greenville, SC (US); Daniel James Dorriety, Travelers Rest, SC (US); Andrea Booher Kretschmar, Greenville, SC (US); Paul A. Cook, Greenville, SC (US); Brian Leslie Henderson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 280 days.

(21) Appl. No.: 14/964,616

(22) Filed: Dec. 10, 2015

(65) Prior Publication Data

US 2017/0167263 A1 Jun. 15, 2017

(51) Int. Cl.
*F01D 5/00* (2006.01)
*B33Y 10/00* (2015.01)
(Continued)

(52) U.S. Cl.
CPC ............ *F01D 5/005* (2013.01); *B23K 1/0018* (2013.01); *B23K 1/19* (2013.01); *B23K 1/20* (2013.01);
(Continued)

(58) Field of Classification Search
CPC ............ F01D 5/005; F01D 5/20; F01D 5/147; B23K 35/0222; B23K 35/0205; B23K 1/0018; B23K 35/3046; B23K 35/3033; B23K 35/0255; B23K 35/0244; B23K 35/30; B23K 35/025; B23K 35/3053; B23K 2201/0001; B33Y 80/10; B33Y 10/00; B23P 6/007; B23P 6/002; F05D 2300/175; F05D 2300/237; F05D 2300/10; F05D 2300/80; F05D 2220/32; F05D 2240/307
See application file for complete search history.

(56) References Cited

U.S. PATENT DOCUMENTS 8,640,094 B2 1/2014 Burckart et al.
8,640,942 B1 2/2014 Ozbaysal et al.
(Continued)

FOREIGN PATENT DOCUMENTS

EP 0 024 142 A1 2/1981
GB 2 447 146 A 9/2008
(Continued)

OTHER PUBLICATIONS

U.S. Appl. No. 14/794,838, filed Jul. 9, 2015, Cui, et al.
(Continued)

*Primary Examiner* — Moshe Wilensky
(74) *Attorney, Agent, or Firm* — Eversheds Sutherland (US) LLP

(57) ABSTRACT

The present application provides a method of repairing a turbine blade. The method may include the steps of removing an existing tip cap from the turbine blade in whole or in part, machining the turbine blade to form a machined groove, positioning an insert in the machined groove, welding the insert to the turbine blade, and brazing the turbine blade.

18 Claims, 3 Drawing Sheets

100
250
110
260
230, 240

(51) Int. Cl.

| | |
|---|---|
| ***B33Y 80/00*** | (2015.01) |
| ***B23K 1/00*** | (2006.01) |
| ***B23P 6/00*** | (2006.01) |
| ***F01D 5/14*** | (2006.01) |
| ***B23K 35/30*** | (2006.01) |
| ***B23K 35/02*** | (2006.01) |
| ***F01D 5/20*** | (2006.01) |
| ***B23K 1/19*** | (2006.01) |
| ***B23K 1/20*** | (2006.01) |
| *B23K 101/00* | (2006.01) |

(52) U.S. Cl.

CPC ........ *B23K 35/025* (2013.01); *B23K 35/0222* (2013.01); *B23K 35/0244* (2013.01); *B23K 35/0255* (2013.01); *B23K 35/30* (2013.01); *B23K 35/3033* (2013.01); *B23K 35/3046* (2013.01); *B23K 35/3053* (2013.01); *B23P 6/002* (2013.01); *B23P 6/007* (2013.01); *B33Y 10/00* (2014.12); *B33Y 80/00* (2014.12); *F01D 5/147* (2013.01); *F01D 5/20* (2013.01); *B23K 2101/001* (2018.08); *F05D 2220/32* (2013.01); *F05D 2230/10* (2013.01); *F05D 2230/237* (2013.01); *F05D 2230/80* (2013.01); *F05D 2240/307* (2013.01); *F05D 2300/175* (2013.01)

(56) References Cited

U.S. PATENT DOCUMENTS

| | | | | |
|---|---|---|---|---|
| 8,978,249 | B2 | 3/2015 | Hovel et al. | |
| 9,009,965 | B2 | 4/2015 | Tragesser et al. | |
| 9,057,271 | B2 | 6/2015 | Bruck et al. | |
| 2004/0134887 | A1* | 7/2004 | Murphy | B23K 9/04 219/76.14 |
| 2008/0265005 | A1* | 10/2008 | Minor | B23K 1/0018 228/124.1 |
| 2010/0239412 | A1* | 9/2010 | Draper | F01D 5/186 415/115 |
| 2014/0017415 | A1 | 1/2014 | Lin et al. | |
| 2014/0147283 | A1 | 5/2014 | Ward, Jr. et al. | |
| 2014/0147285 | A1 | 5/2014 | Salm et al. | |
| 2014/0157597 | A1 | 6/2014 | Connor et al. | |
| 2014/0220376 | A1 | 8/2014 | Schick et al. | |
| 2014/0341743 | A1 | 11/2014 | Connor et al. | |
| 2014/0356056 | A1 | 12/2014 | Xie et al. | |
| 2015/0056469 | A1 | 2/2015 | Cui et al. | |
| 2015/0071788 | A1 | 3/2015 | Thompson et al. | |
| 2015/0111060 | A1 | 4/2015 | Kottilingam et al. | |

FOREIGN PATENT DOCUMENTS

| | | | |
|---|---|---|---|
| JP | H9-168927 | A | 6/1997 |
| WO | 01/51772 | A1 | 7/2001 |

OTHER PUBLICATIONS

Extended European Search Report and Opinion issued in connection with corresponding EP Application No. 16200630.8 dated May 11, 2017.

* cited by examiner

SYSTEMS AND METHODS FOR DEEP TIP CRACK REPAIR

TECHNICAL FIELD

The present application and the resultant patent relate generally to gas turbine engines and more particularly relate to systems and methods for deep tip crack repair in a turbine airfoil and related components.

BACKGROUND OF THE INVENTION

Cast turbine blades often include a structure known as a tip cap at the far end thereof. A tip cap is a relatively small extension of the blade. The tip cap may have a cross-sectional shape conforming to that of the blade and may be integral with or mounted on the radially outer end of the blade. After a period of time in service, the tip cap may be eroded, oxidized, and/or corroded by impingement of the hot combustion gases. Because the turbine blade may be expensive to produce, repair or refurbishment of the damaged blade may be preferred if possible. The repair of a turbine blade tip cap may be performed by grinding away the damaged material and then welding or otherwise attaching replacement material. Cooling the tip cap also may extend the overall useful component lifetime. Providing cooling, however, has been difficult due to manufacturing constraints.

SUMMARY OF THE INVENTION

The present application and the resultant patent thus provide a method of repairing a turbine blade. The method may include the steps of removing an existing tip cap from the turbine blade in whole or in part, machining the turbine blade to form a machined groove, positioning an insert in the machined groove, welding the insert to the turbine blade, and brazing the turbine blade.

The present application and the resultant patent further provide a turbine blade for use in a gas turbine engine. The turbine blade may include an airfoil, a tip cap at the end of the airfoil, an insert welded to the airfoil about the tip cap, and a brazeable paste brazed about the insert.

The present application and the resultant patent further provide a method of repairing a turbine blade. The method may include the steps of removing an existing tip cap from the turbine blade in whole or in part, machining a crack in the turbine blade to form a machined groove, positioning a pre-sintered preform insert in the machined groove, welding the pre-sintered preform insert to the turbine blade, and brazing the turbine blade.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
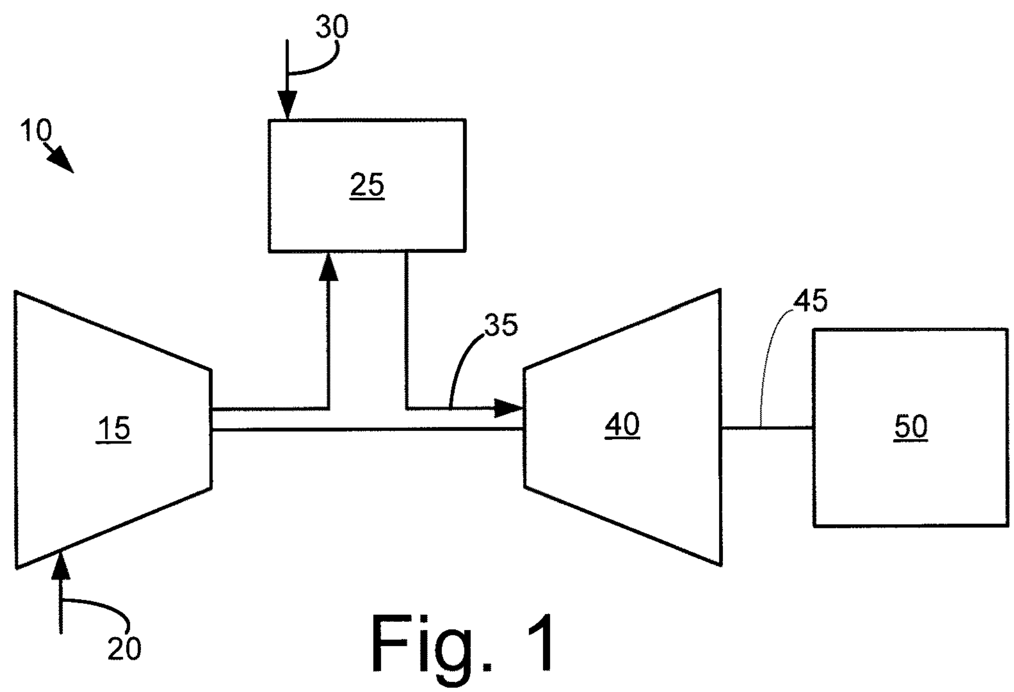
FIG. 1 is a schematic diagram of a gas turbine engine showing a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 positioned in a circumferential array and the like. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
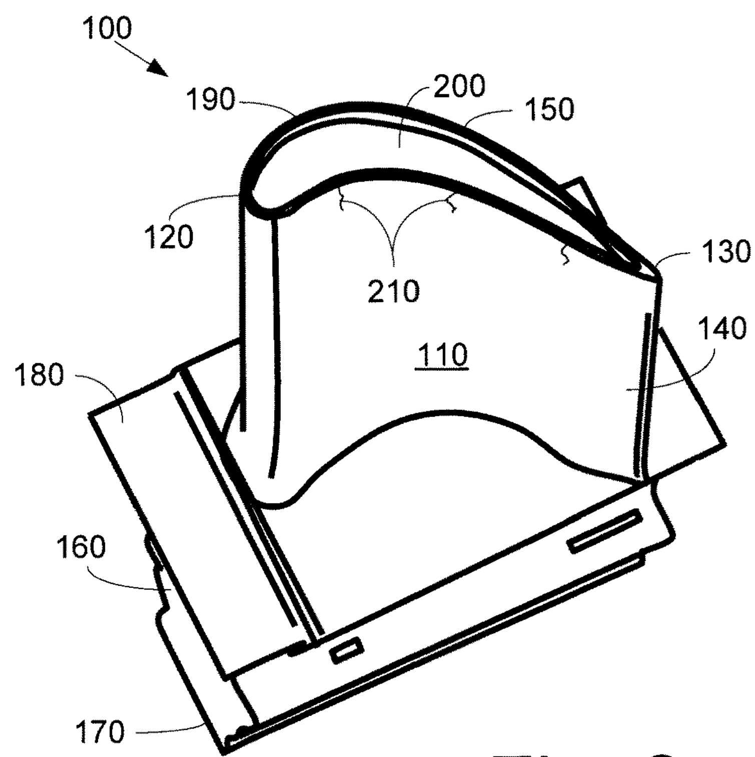
FIG. 2 is a perspective view of a turbine blade with several cracks extending therein.

FIG. 2 is a perspective view of an example of a turbine blade 100. In this example, the turbine blade 100 may be a stage one bucket although any type of blade may be used herein. Generally described, the turbine blade 100 includes an airfoil 110. The airfoil 110 may extend from a leading edge 120 to a trailing edge 130 with a concave pressure side outer wall 140 and a convex suction side outer wall 150. The turbine blade 100 also may include a downwardly extending shank 160 and an attachment in the form of a dovetail 170. A platform 180 may extend transversely between the airfoil 110 and the shank 160 and the dovetail 170. The radial end of the airfoil 110 may include a tip cap 190. The tip cap 190 may be an extension of the outer sidewalls 140, 150. The tip cap 190 may define a recessed area 200 therein. The turbine blade 100 and the tip cap 190 described herein are for the purposes of example only. Many other designs and configurations may be known.

As described above, the tip cap 190 may be subjected to high temperatures and may rub against a seal structure such as a stationary shroud. As a result, cracks 210 may develop in or about the tip cap 190 due to thermally induced stresses and material losses due to oxidation and the like. In order to repair the turbine blade 100, the tip cap 190 may be machined down so as to remove the cracks 210 or other types of worn out, damaged, or otherwise defective locations. The tip cap material may be machined down in a conventional fashion. Deeper cracks 210 may be repaired by welding and the like. Conventional welding techniques, however, can only repair cracks 210 of a limited depth. Airfoils 110 with cracks 210 beyond this limit depth may not be salvageable. Moreover, conventional welding techniques generally require a highly skilled worker and may be time consuming.

Figure 3:
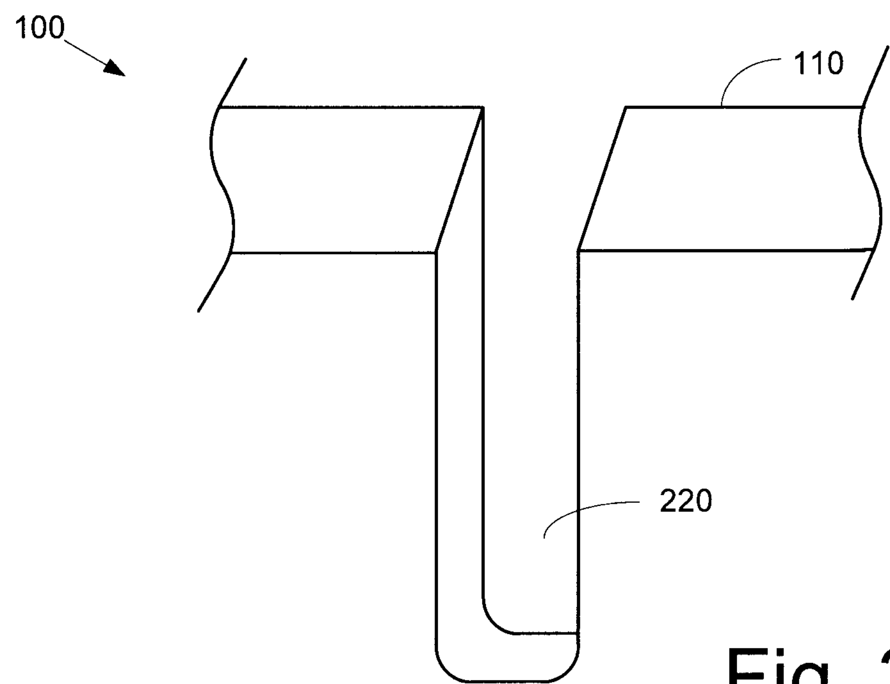
FIG. 3 is a partial perspective view of the turbine blade of FIG. 2 with a machined area.
Figure 4:
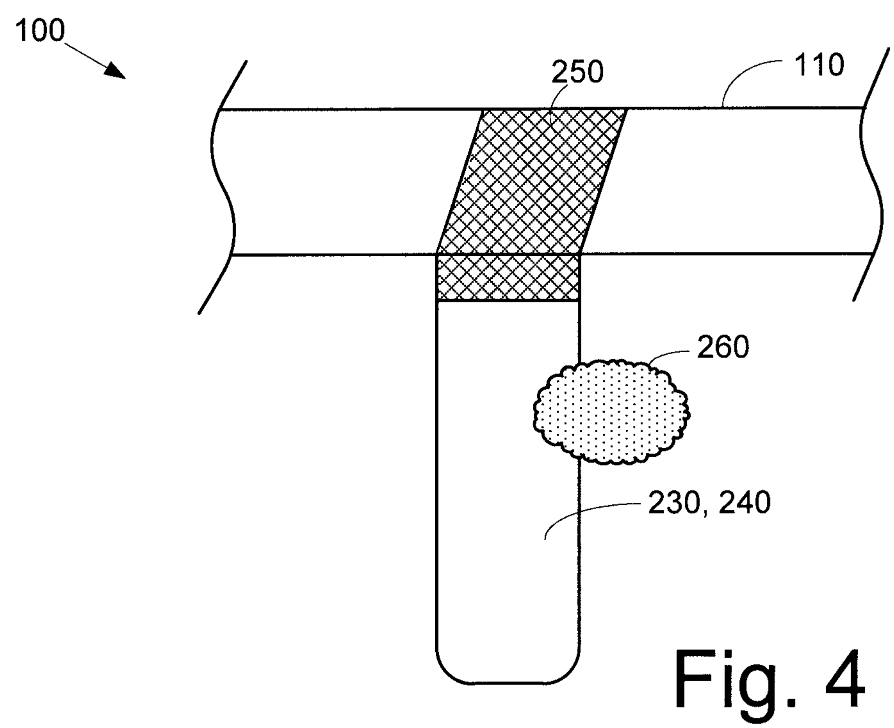
FIG. 4 is a partial perspective view of the turbine blade of FIG. 2 with the machined area filled with an insert and a welding alloy.

In order to repair airfoils 110 with deeper cracks 210, FIG. 3 shows the airfoil 110 with a machined groove 220 about the machined tip cap 190. Specifically, the airfoil 110 may be precisely machined to remove the crack 210. The machined groove 220 may match the relative size, shape, and configuration of an insert 230 in whole or in part. The insert 230 may be made from a pre-sintered preform (PSP) 240 and/or other types of materials. The pre-sintered preform material 240 may be a brazeable superalloy and the like. Specifically, the pre-sintered preform material 240 may be a blend of brazing and superalloy powders. Alternatively, a base material, a base alloy, combinations thereof, and other materials may be used. The insert 230 may be a solid element, a foil, a paste, a honeycomb configuration, combinations thereof, and the like. Combinations of solid elements such as plates and other structures may be used. The insert 230 may have any suitable size, shape, or configuration. The insert 230 may be created in a conventional manner. An additive manufacturing process, i.e., three dimensional printing, also may be used to form the insert 230. Other components and other configurations may be used herein.

Once the insert 230 is positioned within the machined groove 220, the insert 230 may be welded (essentially tacking) into place via a welding alloy 250 and the like. The insert 230 may be somewhat undersized so as to allow room for the welding alloy 250 to extend to the surface of the groove 220. Once set, the welding alloy 250 may be finished in a conventional manner. The welding alloy 250 may be a conventional material suitable for welding. Once the insert 230 is welded into place via the welding alloy 250, the turbine blade 55 may go through a brazing cycle. The brazing cycle may or may not use an additional amount of a brazeable paste 260 or other type of brazeable material about the machined area 220, the insert 230, and along the airfoil 110 in whole or in part. Conventional brazing techniques may be used. The brazeable paste 260 may be conventional material suitable for brazing.

The crack 210 in the airfoil 110 thus may be repaired by machining the crack 210, welding the insert 230 into place, and brazing the airfoil 110 in whole or in part. The insert 230 may be locked into place via the welding alloy 250 and the brazing process. Once repaired, the tip cap 190 may be replaced in a conventional manner. Specifically, the insert 230 may act as a platform for the tip cap 190 to be rebuilt thereon. Multiple inserts 230 may be used to repair multiple cracks 210. Other components and other configurations may be used herein.

Figure 5:
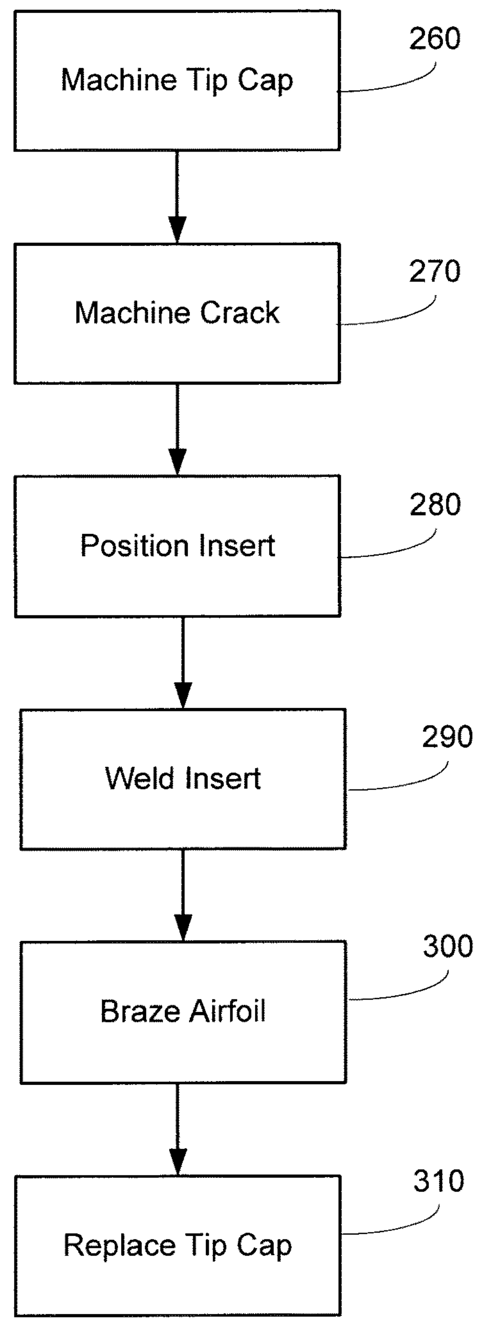
FIG. 5 is a flow chart showing exemplary steps in repairing a turbine blade as may be described herein.

FIG. 5 shows a flowchart of exemplary steps in carrying out the methods described herein in whole or in part. At step 260, the existing tip cap 190 may be machined down on the airfoil 110. At step 270, a crack 210 may be removed via the machined groove 220. At step 280, the insert 230 may be positioned within the machined groove 220. At step 290, the insert 230 may be welded into place via the welding alloy 250. At step 300, the airfoil 110 may undergo a brazing cycle. At step 310, the tip cap 190 may be replaced. The improved turbine blade 100 may now be ready for use and/or other types of processing. The methods steps described herein are not exclusive. Other or different methods steps may be used in any desired order to repair the turbine blade 100.

The system and methods described herein thus provide for the fast and efficient repair of turbine blades 100 with deep tip cracks 210. The systems and methods described herein allow for the repair of turbine blades 100 with deeper cracks 210 that may not be repairable via simply welding or brazing in a conventional manner. The systems and methods described herein thus may extend the useful lifetime of the turbine blade 100 in a fast and cost effective manner. The systems and methods described herein also may be applicable to other types of hot gas path components, other types of turbine components, and the like.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A method of repairing a turbine blade comprising an airfoil, the method comprising:

removing an existing tip cap from the airfoil of the turbine blade in whole or in part to repair a crack in or about the tip cap and the airfoil;

machining the airfoil about the crack to form a machined groove comprising an open end and a closed end in the airfoil;

positioning an insert in the machined groove against the closed end of the machined groove, wherein the insert is undersized relative to the machined groove to provide a space between the open end of the machined groove and an end of the inert, wherein the space comprises a vertical gap having a vertical height extending between a top end of the insert and a surface of the airfoil about the open end of the machined groove;

welding the insert within the machined groove via a welding alloy within the space between the open end of the machined groove and the end of the inert to fill the vertical gap, wherein the welding alloy extends from the top end of the insert to the surface of the airfoil about the open end of the machined groove to lock the insert in place within the machined groove and to fill the vertical gap; and brazing the turbine blade about the machined groove, the insert, welding alloy, and the airfoil to lock the insert in place within the machined groove.

2. The method of claim 1, wherein the step of removing an existing tip cap comprises machining the tip cap.

3. The method of claim 1, further comprising the step of replacing the tip cap on the turbine blade.

4. The method of claim 1, further comprising the step of forming the insert.

5. The method of claim 4, wherein the step of forming the insert comprises forming the insert from a pre-sintered preform material.

6. The method of claim 4, wherein the step of forming the insert comprises forming the insert from a superalloy material.

7. The method of claim 4, wherein the step of forming the insert comprises forming the insert from a base material.

8. The method of claim 4, wherein the step of forming the insert comprises an additive manufacturing process.

9. The method of claim 1, wherein the step of machining the turbine blade to form a machined groove comprises machining the machined groove to accommodate the insert.

10. The method of claim 1, wherein the step of machining the turbine blade to form a machined groove comprises machining the machined groove to accommodate the insert and the welding alloy.

11. The method of claim 1, wherein the step of welding the insert to the turbine blade comprises the welding alloy on top of the insert.

12. The method of claim 1, wherein the step of brazing the turbine blade comprises brazing a brazeable paste thereon.

13. The method of claim 1, wherein the turbine blade comprises a stage one bucket.

14. A method of repairing a turbine blade comprising an airfoil, the method comprising:

removing an existing tip cap from the airfoil of the turbine blade in whole or in part to repair a crack in or about the tip cap and the airfoil;

machining the airfoil about the crack to form a machined groove comprising an open end and a closed end in the air foil;

positioning a pre-sintered preform insert in the machined groove against the closed end of the machined groove, wherein the pre-sintered insert is undersized relative to the machined groove to provide a space between the open end of the machined groove and an end of the pre-sintered preform inert, wherein the space comprises a vertical gap having a vertical height extending between a top end of the pre-sintered preform insert and a surface of the airfoil about the open end of the machined groove;

welding the pre-sintered preform insert within the machined groove via a welding alloy within the space between the open end of the machined groove and the end of the pre-sintered preform inert to fill the vertical gap, wherein the welding alloy extends from top end of the pre-sintered preform insert to the surface of the airfoil about the open end of the machined groove to lock the pre-sintered preform insert in place within the machine groove and to fill the vertical gap; and brazing the turbine blade about the machined groove, the insert, the welding alloy, and the airfoil to lock the pre-sintered preform insert place within the machined groove.

15. The method of claim 14, wherein the step of removing an existing tip cap comprises machining the tip cap.

16. The method of claim 14, further comprising the step of replacing the tip cap on the turbine blade.

17. The method of claim 14, wherein the step of welding the insert to the turbine blade comprises the welding alloy on top of the insert.

18. The method of claim 14, wherein the step of brazing the turbine blade comprises brazing a brazeable paste.

* * * * *